US006244188B1

(12) United States Patent
Buechi (10) Patent No.: US 6,244,188 B1
(45) Date of Patent: Jun. 12, 2001

(54) DEVICE FOR DRIVING BODIES ALONG A PREDETERMINED COURSE

(75) Inventor: Robert Buechi, Weinfelden (CH)

(73) Assignee: IPT Weinfelden AG, Weinfelden (CH)

( * ) Notice: Subject to any disclaimer, the term of this patent is extended or adjusted under 35 U.S.C. 154(b) by 0 days.

(21) Appl. No.: 09/248,092

(22) Filed: Feb. 10, 1999

(30) Foreign Application Priority Data

Feb. 11, 1998 (CH) .................................................. 0341/98

(51) Int. Cl.⁷ .................................................. A63G 1/00
(52) U.S. Cl. .................................................. 104/25
(58) Field of Search ...................... 104/25, 18; 213/75 R (56) References Cited

U.S. PATENT DOCUMENTS

| 4,444,302 | * | 4/1984 | Dunstan | .................................. 104/25 |
| 4,509,429 | * | 4/1985 | de Broqueville | .................. 104/25 |

FOREIGN PATENT DOCUMENTS

| 608 089 | 5/1989 | (AU) . |
| 89/01451 | 2/1989 | (WO) . |

* cited by examiner

*Primary Examiner*—S. Joseph Morano
*Assistant Examiner*—Robert J. McCarry, Jr.
(74) *Attorney, Agent, or Firm*—Rankin, Hill, Porter and Clark LLP (57) ABSTRACT

Bodies (5) are driven along a predetermined path by being coupled by pairs of cooperating coupling elements to a hauling line (1) which is guided generally in parallel with the predetermined path. The hauling line can be an endless hauling tape guided around deflection rollers (2) and simultaneously serving as a first coupling element. For the coupling function, the hauling tape (1) is elastically deformable perpendicular to its length, e.g., compressible, and cooperates with a second coupling element on the body (5) to be driven. The second coupling element is a groove (6) matched to the hauling tape (1) having two open ends and extending in parallel to the predetermined path, into which groove a length of the hauling tape is positionable. For coupling, the body (5) and the hauling tape (1) are guided toward each other such that the hauling tape (1) is pressed into the groove (6), where a displacement perpendicular to the predetermined path is prevented by suitable guide means (2, U). The bodies (5) to be driven can be designed as conveying means so that the device is applicable as a conveying device.

12 Claims, 5 Drawing Sheets

DEVICE FOR DRIVING BODIES ALONG A PREDETERMINED COURSE

FIELD OF THE INVENTION

This invention is in the field of the conveying technology and concerns a device for driving bodies along a predetermined course or path using a hauling means to which the bodies to be driven are coupled.

BACKGROUND OF THE INVENTION

It is known to drive bodies along predetermined paths by coupling them to a hauling means moving substantially in parallel to the predetermined path. This kind of hauling means is e.g. an endless chain driven and guided by chain wheels and possibly further guided in a guiding channel along the predetermined path. For coupling, bodies and chain are guided together and e.g. teeth (passive coupling means) arranged on the bodies engage in the chain such coupling the bodies to the chain such that they are hauled along the path by the chain. In this kind of system, coupling works faultlessly only if the chain and the bodies are brought together in a synchronized manner or if the bodies so to speak wait for being hauled in a predetermined position. In any case, coupling and hauling is governed by a rhythm which is determined by the design of the chain and by its speed. The same is valid for "active" coupling means which are brought into a coupling position or configuration for being coupled to a hauling chain.

It is also known to use hauling ropes for hauling in the same manner as described for a hauling chain. The bodies are coupled to a hauling rope with the aid of active coupling means, e.g. by clamps. The clamps are brought into a clamping position in which they are tightened around the rope and locked by friction. For de-coupling, the clamps are opened. Systems with this kind of hauling-rope-drive can be operated in a rhythm which is determined by other elements than the rope and its speed and which may also vary. They can also be operated without any regular rhythm because the coupling means can be coupled to any part of the rope length.

SUMMARY OF THE INVENTION

An object of the invention is to provide a device for driving bodies along a predetermined path, which device comprises a hauling means along the predetermined path and coupling means for coupling the bodies to the hauling means. The inventive device is simple and does not determine the rhythm of coupling which means that it can be used for a large variety of applications and can be combined with a large variety of other drives. Additionally, the inventive device is applicable in a substantially unchanged manner for the most varied predetermined paths, i.e. for paths with gradients, with curves and/or with torsion.

A principle feature of a device in accordance with the invention is a coupling means which comprises a first coupling element arranged on the hauling means and a second coupling element on the body to be driven. The two coupling elements are arranged on body and hauling means in a manner matched to each other and substantially parallel to the predetermined path and they have a substantially constant cross-section over their lengths, whereby the first coupling element extends over the whole predetermined path and the second coupling element extends over at least part of the body to be driven. One coupling element is elastically deformable in a direction perpendicular to the predetermined path and the other one is designed so that when the coupling elements are pressed against each other it deforms the elastically deformable element such that elastic forces are generated between the coupling elements, which forces are directed perpendicular to the predetermined path and cause friction between the coupling elements, which friction prevents the coupling elements from moving relative to each other in a direction parallel to the predetermined path.

For a coupling step, the hauling means and the body to be driven are brought against each other such that, in a coupling station, the two coupling elements are pressed against each other resulting in a friction-type locking of the two. In the coupling station, suitable guiding means are provided in order to prevent the hauling means and the body to be coupled to the hauling means from being displaced perpendicular to the predetermined path when they are pressed together. For de-coupling the body from the hauling means, the hauling means and the body are guided away from each other in a decoupling station such that the coupling elements are pulled apart and thus separated from each other. In the de-coupling station, suitable guide means are provided in order to prevent displacement of the hauling means or of the body to be de-coupled perpendicular to the predetermined path. The deformable and the deforming coupling elements are designed and matched to each other such that the deformation is maintained after coupling without external forces.

For creating a sufficient friction-type locking between the two coupling elements, the material matching and the strength and manner of the deformation of the one coupling element by the other coupling element are chosen such that the resulting friction is larger than the inertia and the friction to be overcome on hauling.

As the coupling elements extend with substantially constant cross-section and substantially parallel to the predetermined path on the body and on the hauling means, coupling is possible in any position of the hauling means, i.e., the device does not have an inherent coupling rhythm.

The hauling means of the inventive device is e.g. an elongated tape having a cross-section which is substantially the same over its whole length. Due to the fact that the tape is elastically deformable perpendicular to its length, e.g., compressible, it serves as the first coupling element itself. This tape is, e.g., ring-shaped and is arranged along the predetermined path with the help of deflection rollers of which at least a part is driven. A body to be coupled to the tape comprises, as a second coupling element, a groove which can be oriented to be substantially parallel to the predetermined path and which has two open ends and a cross-section such that a length of the tape is positionable in the groove in an elastically compressed state. Due to the compression of the tape positioned in the groove, elastic forces press the tape against the wall of the groove and create friction acting against displacement of the tape in the groove along the groove length.

In a coupling station the hauling tape and a body to be coupled to the hauling tape are guided such that the tape is pressed into the groove of the body. For this purpose suitable guide means are to be provided on the side of the body, by means of which displacement of the tape and/or of the body perpendicular to the predetermined path is restricted or fully prevented.

For de-coupling a body from the hauling tape, the tape is extracted from the groove, during which it is again seen to, by means of suitable guide means, that during the de-coupling, the tape and the body are not dislocated perpendicular to the predetermined path in an undesired manner.

According to the load on the hauling tape and according to its characteristics, the hauling tape may not only drive a body coupled to it (haul it along the predetermined path) but also support and/or guide the body where required. On the other hand, it is possible to guide and/or support the hauled body by separate means, e.g. corresponding rails arranged along the predetermined path on which means the body rolls or glides, in which case the tape has a pure hauling function.

The hauling tape being deformable perpendicular to its length and serving at the same time as hauling means and as deformable first coupling element belongs to a preferred embodiment of the invention, but the invention is not restricted to this embodiment. The hauling means may also be a chain with links carrying a first coupling element which extends over the length of the chain with a substantially constant cross-section. This coupling element may comprise interruptions which, compared with the longitudinal extension of the second coupling elements, are only very short. Instead of the chain, a line of unconnected, force transmitting bodies can also be provided as hauling means, which bodies are pushed towards each other by means of a corresponding drive and, like the above mentioned chain links, carry a coupling element which is possibly interrupted several times.

The inventive device is, e.g., used for conveying purposes, wherein the bodies to be driven are conveying means for conveying goods along a predetermined path. The bodies may be individual conveying means independent of each other and, e.g., being supplied to the coupling station along a descending grade by means of gravity, or they may be conveying means being connected to each other in the manner of a chain and being pulled into the coupling station by bodies further downstream already coupled to the hauling means.

BRIEF DESCRIPTION OF THE DRAWINGS

A number of different embodiments of devices in accordance with the invention are described in detail with reference to the following drawings wherein.

DESCRIPTION OF PREFERRED EMBODIMENTS

Figure 1A:
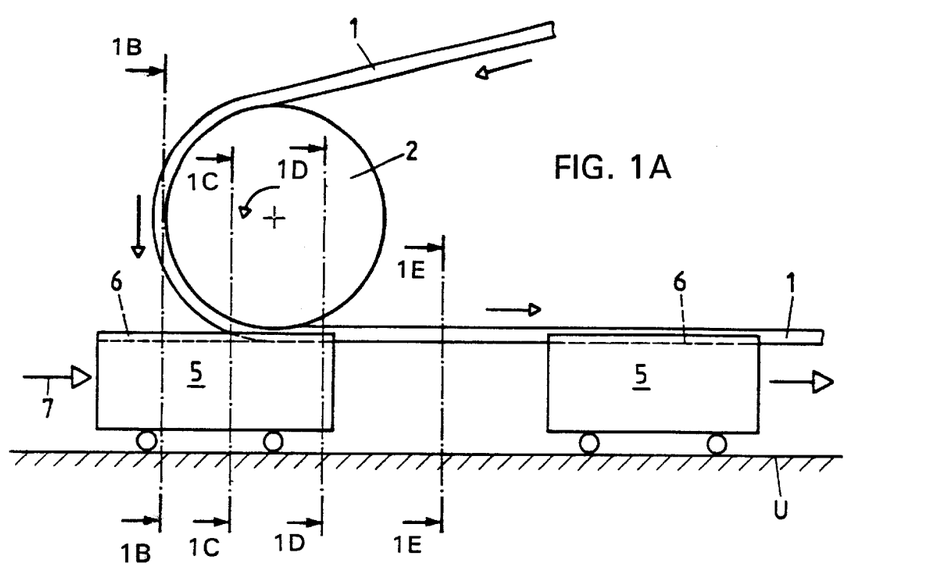
FIG. 1A is a schematic side elevation of one embodiment of the invention with a hauling tape which is at the same time the hauling means and the first coupling element.

FIG. 1A shows an embodiment of an inventive device viewed perpendicular to a predetermined path along which bodies are to be driven, wherein only one coupling location or station and a first part of the predetermined path are shown. The device comprises an, e.g., endless hauling tape 1 serving as hauling means and as first coupling element. The hauling tape is guided and driven by a deflection roller 2 which can also be a driving roller and by further deflection means, not shown, such that it runs substantially in parallel with the predetermined path from deflection roller 2. In this context, the term "tape" is used to refer to a line, strand or cable, the term not being confined to any specific shape. In the illustrated case, the predetermined path is a path (in the paper plane of the figure) on a support U, which path may be defined by rails or other guide means (not shown). The bodies are shown here as small vehicles 5 having two axles and rolling on support U.

As a second coupling element, each vehicle 5 comprises a groove 6 extending from front to back along its top, the height of the groove 6 above the support U being substantially the same as the distance between support U and hauling tape 1. The hauling tape is pressed into groove 6 of a vehicle 5 underneath the deflection roller by deflection roller 2 (coupling guide), and at the same time support U prevents the vehicle from being displaced perpendicular to the predetermined path.

Each vehicle 5 to be hauled is to be moved, as shown by arrow 7, toward and underneath the deflection roller at least far enough for a sufficient length of hauling tape 1 to be positioned in groove 6 for frictionally engaging the groove with sufficient force to prevent longitudinal movement of the tape in the groove. This force must, at least, be present when hauling tape 1 is positioned in the whole length of groove 6, i.e., when the rear edge of the vehicle 5 has passed the lower apex of deflection roller 2.

FIG. 1A shows support U as a horizontal and even plane. This is not a condition for the invention which can also haul vehicles 5 along an ascending support or decelerate them on a descending support.

A de-coupling station for the embodiment of the inventive device as shown in FIG. 1A is arranged substantially the same as the shown coupling station, wherein hauling tape 1 and vehicles 5 move in the other direction.

Figure 1B:
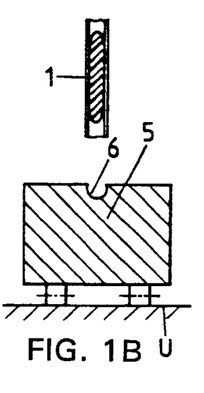
FIGS. 1B, 1C, 1D and 1E are transverse sectional views along lines 1B—1B, 1C—1C, 1D—1D and 1E—1E, respectively, of FIG. 1A.
Figure 1C:
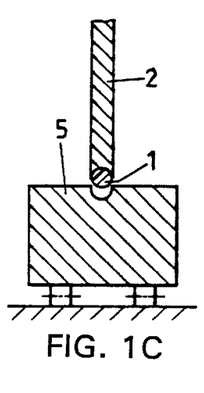
Figure 1D:
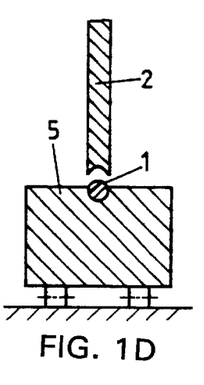
Figure 1E:
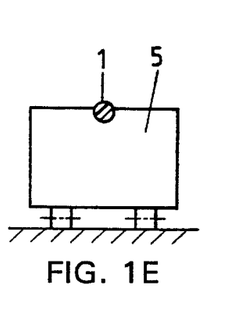

For illustrating the coupling, sections perpendicular to the predetermined path are also shown in FIG. 1B (before the coupling station), at FIG. 1C (in the coupling station), at FIG. 1D (after the coupling station) and at FIG. 1E (between two vehicles 5 coupled to the hauling tape 1). From these sections it can be seen how hauling tape 1 is pressed into groove 6 by deflection roller 2 when a vehicle 5 is moved through the coupling station.

Hauling tape 1 advantageously comprises a plastic having suitable elastic deformability. As tapes made of this kind of material are normally of equal elasticity in all directions, i.e. the tape is stretchable in longitudinal direction, the hauling tape must be installed in a pre-stretched condition or corresponding means for stretching the tape must be provided. For applications in which a longitudinal stretching of the hauling tape is not desired, a tape comprising a non-elastic core within an elastically deformable shell or sleeve can be used. As a non-elastic center, a wire rope can be used which is also advantageous for applications comprising great loads.

It is obvious that groove 6 may be elastically deformable instead of hauling tape 1.

For coupling a vehicle 5 to hauling tape 1, relative movement is needed between the vehicle to be coupled and deflection roller 2 serving as the coupling guide for the hauling tape 1, i.e., the vehicle must be moved into the coupling station or the coupling guide is to be moved over a vehicle which is stationary.

For allowing coupling steps without a predetermined rhythm, the hauling tape, as previously mentioned, must have a constant cross-section over its whole length. However, cross-sectional variations having a longitudinal extension considerably shorter than the longitudinal extension of the groove 6 on a body 5 to be driven, do not necessitate a corresponding coupling rhythm. Therefore, a hauling tape can also, e.g., comprise a chain of identical deformable balls with identical radii or of other bodies connected to each other in a suitable manner.

Figure 2:
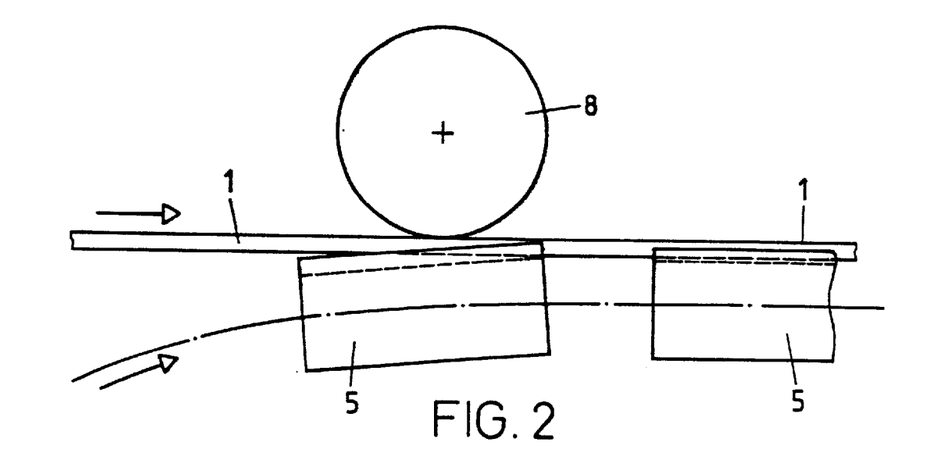
FIG. 2 is a top plan view of an embodiment according to the invention with a side groove for receiving a hauling tape.

FIG. 2 shows a top view of a further simple embodiment of the inventive device, again with vehicles 5 driven along a predetermined path (broken line) by a hauling tape 1. In distinction from FIG. 1, the hauling tape is arranged on the side of the vehicles 5 and the coupling station is not at the same time a deflection station of the hauling tape 1. The hauling tape 1 runs through the coupling station in a substantially straight line while the vehicles 5 are moved on a curved path through the coupling station, e.g. on suitable rails (not shown). For example, a passive roll 8 and e.g. rails (not shown) on which the vehicles 5 roll are provided to serve as coupling guides.

Figure 3:
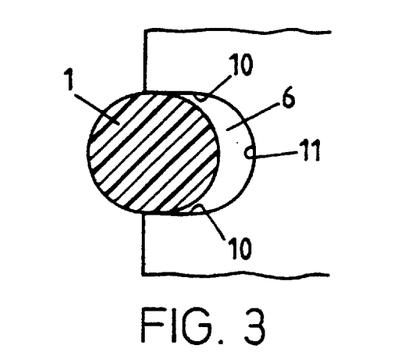
FIGS. 3, 4, 5A and 5B are transverse sectional views of different embodiments of coupling elements usable in the invention.
Figure 4:
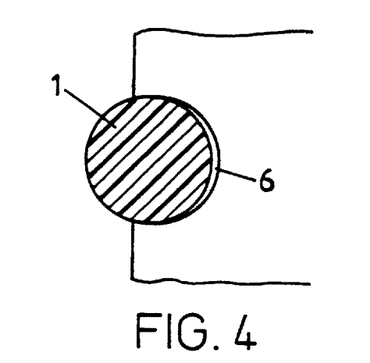
Figure 5A:
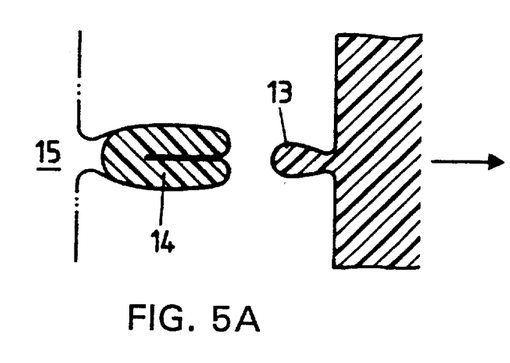
Figure 5B:
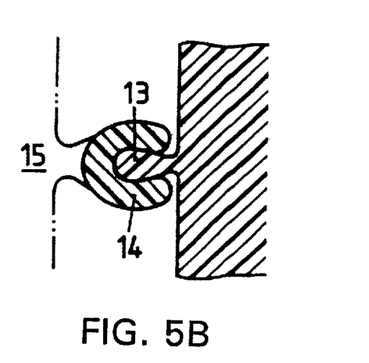

FIGS. 3 to 5 show, on a larger scale, examples of embodiments of coupling devices for the inventive device.

FIG. 3 shows a hauling tape or cord 1 which serves simultaneously as hauling means and as first coupling element and which has a substantially circular cross-section. Groove 6, which functions as the second coupling element, has a cross-section with parallel side walls 10 and an approximately semi-circular bottom 11. The distance between the parallel side walls 10 is smaller than the diameter of the hauling tape 1. When the hauling tape 1 is pressed into the groove 6 it is, as shown, compressed perpendicular to its length or if it is incompressible it deforms the groove walls.

Hauling tape 1 shown in FIG. 4 also has a substantially circular cross section. Groove 6 has a cross-section which substantially corresponds to a circle segment subtending an angle of more than 180° such that the opening of the groove is slightly narrower than the inside of the groove. The width of the groove is again slightly smaller than the diameter of the hauling tape 1 such that the tape positioned in the groove 6 is compressed. The narrowing of the groove opening forms a positive engagement means by which hauling tape 1 is held in groove 6 such that the system can absorb small forces tending to pull the tape out of the groove 6 (forces directed perpendicular to the hauling direction). However, this kind of positive engagement does not contribute to the friction-type locking by which a relative movement between the hauling tape 1 and the groove 6 in hauling direction is prevented.

FIGS. 5A and 5B show a further pair of coupling elements 13 and 14. Coupling element 13 has the form of a ridge and is, e.g., formed on a body to be driven as a second coupling element. The other coupling element 14, e.g., serves as the first coupling element and is a slotted hauling tape or is, as indicated with broken lines, a coupling element designed to have the form of a groove and to be arranged on a different hauling means (e.g. a hauling chain or a line of separate force-transmitting bodies). Of the pair of coupling elements 13 and 14 shown in FIGS. 5B and 5A, the groove-shaped one is obviously elastically deformable while the ridge-shaped one is the deforming coupling element. However, FIGS. 5A and 5B clearly show that not only the deforming or deformable feature but also the first or second coupling element function is interchangeable.

Figure 6:
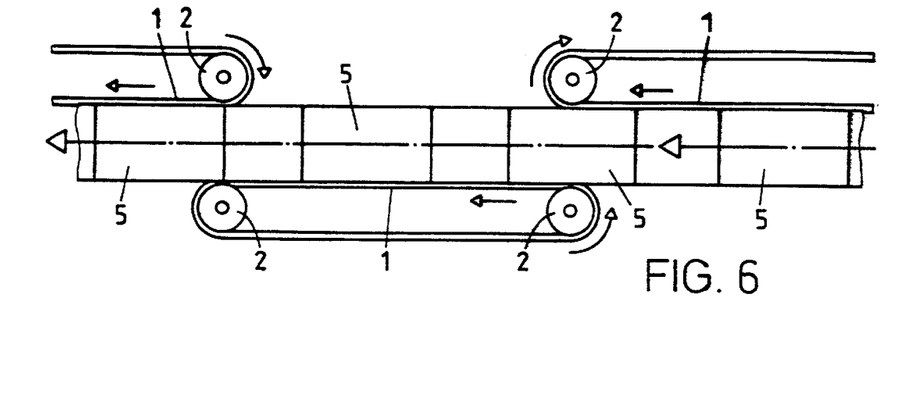
FIG. 6 is a schematic plan view of a predetermined straight path along which bodies are driven using a plurality of cooperating devices in accordance with the invention.

FIG. 6 shows a predetermined path (broken line with arrow) on which vehicles 5 (or other bodies to be driven) are hauled by a series of hauling tapes 1 arranged in succession and alternatingly arranged on opposite sides of the predetermined path. Hauling tapes 1, e.g., co-operate with grooves (not shown) which extend along the two side walls of the vehicles 5. Coupling stations and de-coupling stations are stations where the hauling tapes are deflected by, e.g., 180° around deflection rollers 2, where the deflection rollers 2 serve as coupling guide or de-coupling guide, respectively, depending on the direction of motion, as has been described in connection with FIG. 1. Because two deflection rollers 2 of two successive drives are arranged to be exactly opposite each other they are able to serve for guiding the hauling means (hauling tape 1) and the bodies to be driven (vehicles 5) through the coupling or de-coupling stations, respectively, and to prevent displacement of the hauling means and/or bodies perpendicular to the predetermined path.

Hauling tapes 1 can each be driven by their own motors (not shown) via one of the deflection rollers 2. It is also possible to drive several such drives with one common motor only, so that the opposite deflection rollers 2 are, e.g., functionally coupled to each other by an even number of gear wheels.

As the function of the coupling station is the mirror function of the decoupling station, the hauling direction of an installation as shown in FIG. 6 can be reversed at any time by merely reversing the moving direction of hauling tapes 1.

Figure 7:
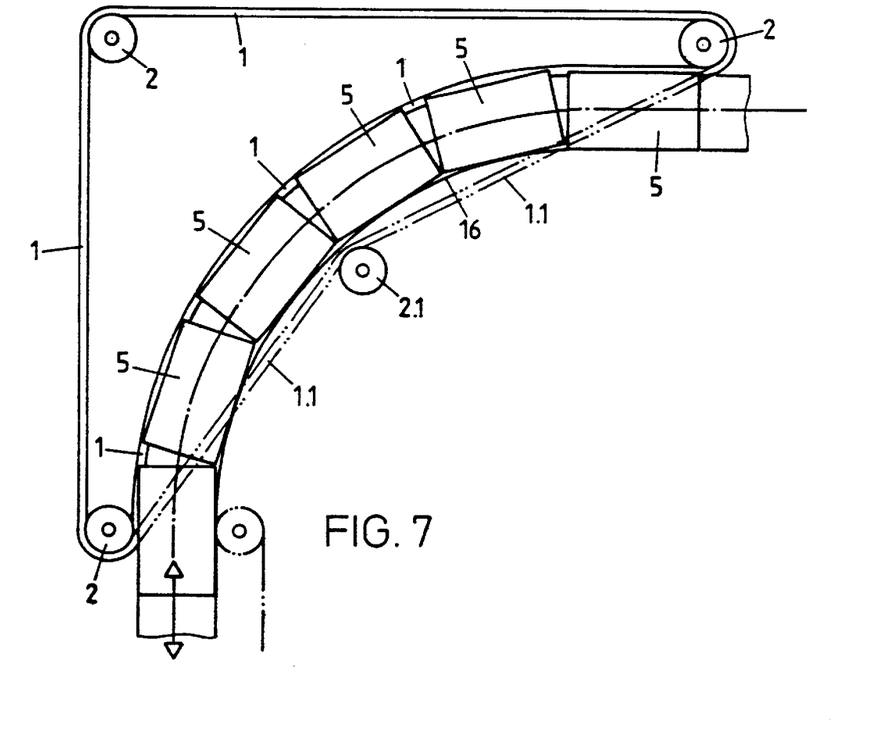
FIG. 7 is a schematic plan view of a curved path along which bodies are guided and driven in accordance with the invention.

FIG. 7 shows a curved, predetermined path (shown as a broken line) on which again vehicles 5 on rails, or bodies guided by other suitable guide means (shown as line 16) are to be driven. Hauling tape 1, acting as the hauling means, is arranged at the outer side of the vehicles 5. Deflection rollers 2 act as a coupling guide and as a de-coupling guide for hauling tape 1 and guide 16 acts as guide means for vehicles 5. Between the deflection rollers 2, the tape runs around an additional deflection roller 2.1 which forms two straight regions (the tape path shown in broken lines and identified as 1.1) when no vehicles are on the curved path. The tape is forced onto a path substantially parallel to the predetermined path by a line of vehicles 5 as shown, wherein guide 16 prevents displacement of vehicles 5 perpendicular to the predetermined path. Depending on the longitudinal elasticity of the tape 1, the longitudinal difference between tape path 1 and tape path 1.1 may or may not need to be compensated by means of a tape tensioning roller.

Depending on the arrangement of the predetermined path and on the design of the coupling elements, tape path 1.1 (with no bodies to be driven) can be adapted by means of more or less additional deflection rollers (2.1) to the predetermined path.

FIGS. 8 to 11 show a body 22 gliding on rails 20 and 21 on at least parts of the predetermined path and being driveable by different hauling means which are, e.g., designed as hauling tapes 1. All of these figures are sections perpendicular to the predetermined path through bodies 22 and through rails 20 and 21 (or 20.1 and 21.1) along which bodies 22 are to be driven. Body 22 is shown very diagrammatically as a simple block. It can, however, be equipped with, e.g., gripping means, with a loading area, with a loading interior or with similar means for a wide variety of conveying applications. Body 22 can, however, also have functions other than conveying functions: e.g. a positioning function which is effected by shifting the body to and from or a force transmission function, in either direction.

Figure 8:
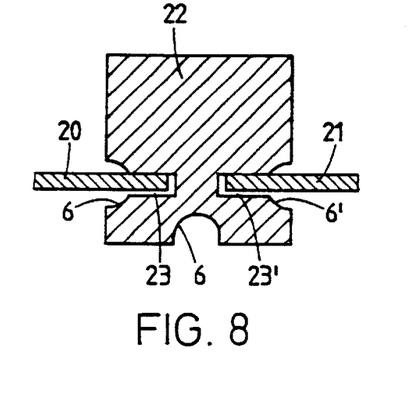
FIGS. 8 to 11 are transverse sectional views of an embodiment of a body gliding on rails and being shown in different regions of a predetermined path along which it is driven by means of devices in accordance with the invention.

FIG. 8 shows body 22 on a part of the path on which it, e.g. requires no external drive, e.g. on a descending part of the path on which it is driven by gravity. The body 22 glides on the upper surfaces of rails 20 and 21 which support the body and which reach into lateral guide grooves 23 and 23' on opposite sides of body 22 to also guide the body laterally.

Figure 9:
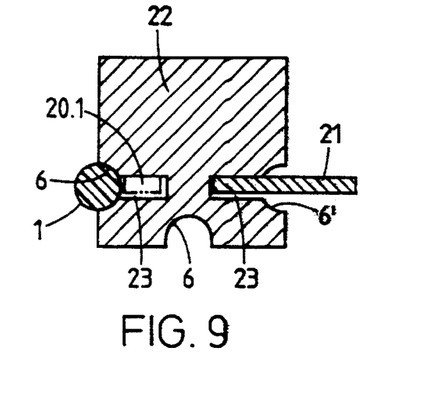

FIG. 9 shows body 22 on a part of the predetermined path on which it is driven by means of a hauling tape 1 arranged on its left side. Hauling tape 1 has a substantially circular cross-section and is pressed into the outer region of guide groove 23, which outer region is enlarged and forms a groove 6 similar to that shown in FIG. 3. Body 22 glides on the right rail 21 as in FIG. 8, but is not only driven by the hauling tape on the left but also supported. Thus, the gliding friction of the body 22 is reduced and the left rail 20 becomes unnecessary. The left rail can, however, on such a part of the path, especially in the region of a coupling stations or a de-coupling stations, extend along the inside of groove 23 (shown with broken lines and identified as 20.1.).

As previously described, for coupling or de-coupling, hauling tape 1 is guided toward or away from body 22 by a deflection roller. In a coupling station for coupling the body 22 to hauling tape 1 shown in FIG. 9, right rail 21 keeps body 22 on the path, which right rail extends (20.1) along the inside of guide groove 23.

Figure 10:
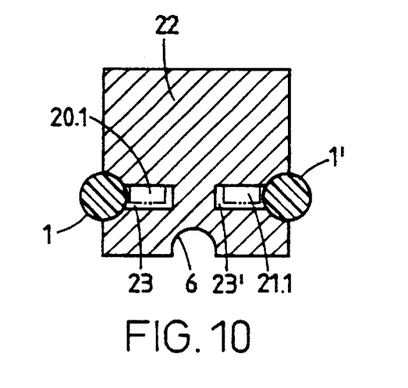

FIG. 10 shows body 22 in a station in which it is driven on both sides by hauling tapes 1 and 1' in the same manner as has been described for the left side in connection with FIG. 9. If the two hauling tapes 1 and 1' are able to support the whole weight of the body 22 and if they are arranged in a suitable manner, the two rails 20 and 21 need only extend (20.1, 21.1) inside of guide grooves 23 and 23' in coupling and de-coupling stations.

Figure 11:
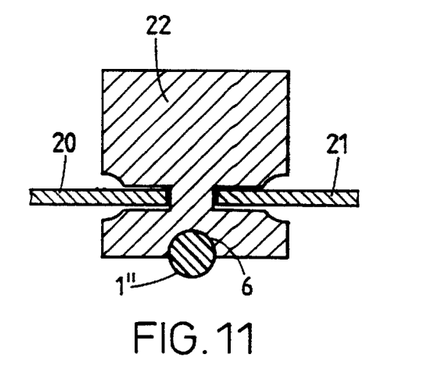

FIG. 11 shows body 22 on a part of the path on which it is driven by a hauling tape 1" positioned in a bottom groove 6. Body 22 is also supported such that the body does not lie on rails 20 and 21, or only slightly, although rails 20 and 21 still perform lateral guidance. For coupling to and de-coupling from the bottom hauling tape 1", e.g., deflection rollers are used as coupling or de-coupling guides, respectively, and rails 20 and 21 guide body 22. It can also be seen that the weight of body 22 can be a sufficient counterweight against the pressure of the hauling tape in a coupling station.

Body 22 to be driven as shown in FIGS. 8 to 11 has lateral grooves for rails 20 and 21. It will be apparent that rails 20 and 21, and also body 22, may have a different position relative to gravity. This means that a predetermined path for body 22 may also comprise torsion.

Figure 12:
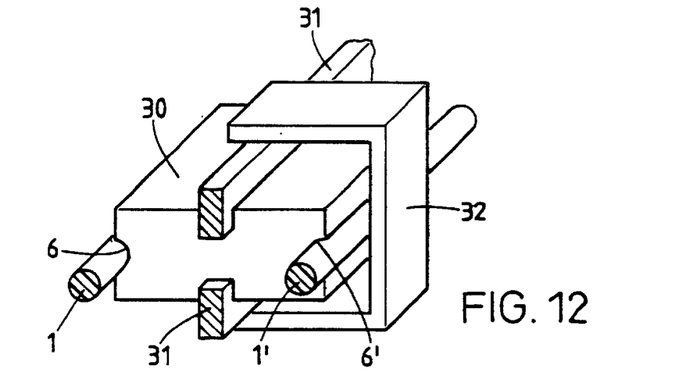
FIG. 12 is a perspective view of a further embodiment of a body gliding on rails and driven by means of a device in accordance with the invention.

FIG. 12 shows a further body 30 to be driven. This body is guided by upper and lower rails 31 which are both held by supports 32 spaced along the path, the rails extending into upper and lower grooves in body 30. Lateral grooves 6 and 6' serve as second coupling elements cooperating with hauling tapes or first coupling elements 1 and 1', respectively. The description of FIGS. 8 to 11 applies appropriately to the functioning of the drive as well as for the coupling and uncoupling of body 30 to and from hauling tapes 1, 1'.

Figure 13:
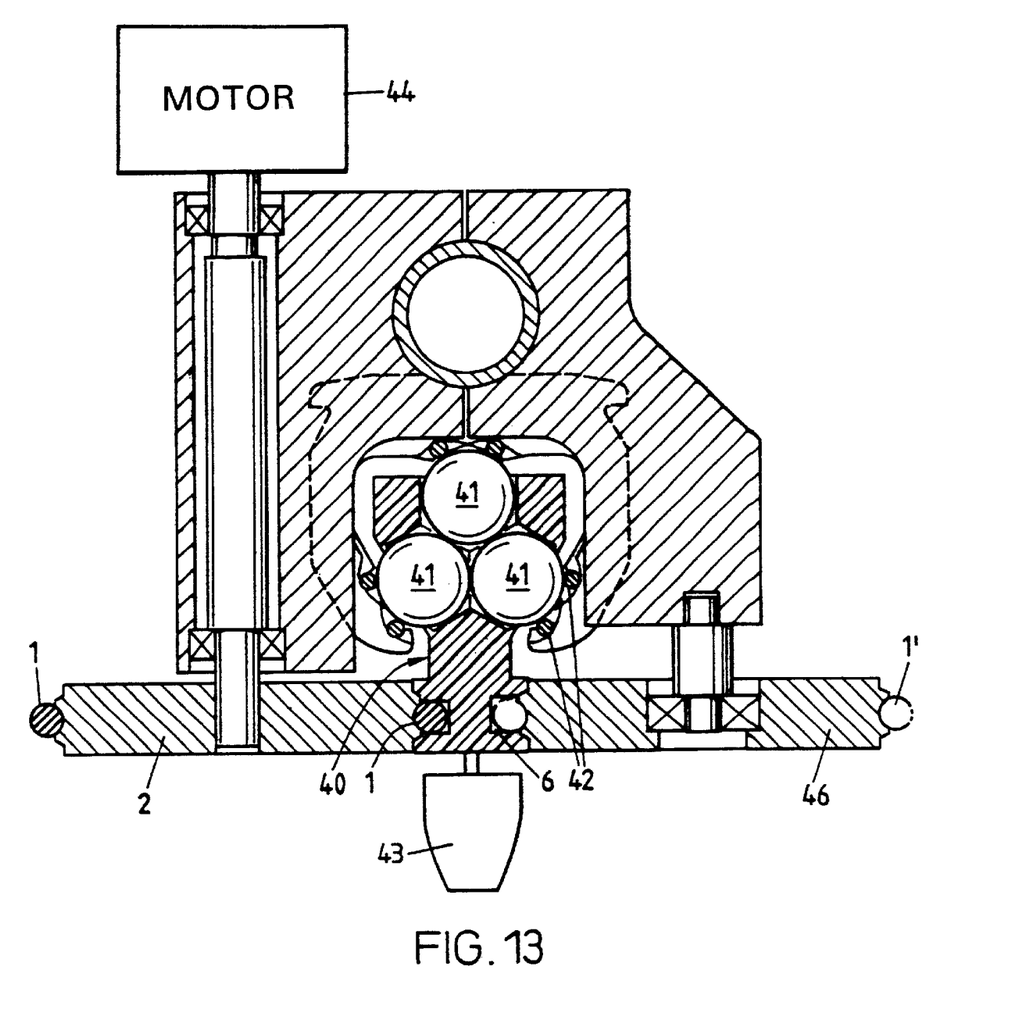
FIG. 13 is a schematic sectional view of an embodiment of a body rolling in a channel and driven by a device in accordance with the invention.

FIG. 13 shows, somewhat more in detail, an embodiment of a device in accordance with the invention which is shown in section perpendicular to a predetermined path. The hauling means which is at the same time the first coupling element is a hauling tape 1. Body 40 to be driven rolls on groups of three balls 41 which ride on six rails 42 arranged to form a guide channel extending along the predetermined path or arranged in such a channel. Body 40 to be driven includes a part protruding from the guiding channel, having grooves 6 arranged on both sides and parallel to the length of the guiding channel and, e.g., carrying a gripping means 43.

The section shown in FIG. 13 represents a coupling or de-coupling station, respectively, in which, on the left side hauling tape 1, is pressed into the groove 6 or is drawn out of it. In this arrangement, a deflection roller 2 driven by a motor 44 serves as the coupling or de-coupling guide, respectively, and a passive roller 46 serves as a counter guide means. Counter-roller 46 can, in the context of an arrangement as shown in FIG. 6, also be a deflection roller for a further hauling tape 1' on the other side of the body to be driven, as shown with broken lies.

Counter deflection roller 46 may comprise a hauling tape 1' on its whole circumference, in which case this represents a degenerated form of the inventive device in which the predetermined path theoretically has no length and the coupling station coincides with the de-coupling station.

Body 40 rolling on groups of three balls 41 and corresponding guide channels is described in the publication EP-0387318, corresponding to U.S. Pat. No. 5,074,678.

What is claimed is:

1. A device for driving at least one body (5, 22, 30, 40) along a predetermined path comprising:
   a hauling means (1, 15) extending along the predetermined path;
   a coupling station having coupling means for coupling said body (5, 22, 30, 40) to said hauling means;
   said hauling means comprising a first coupling element (1, 14), and each said body comprising a second coupling-element (6, 13), said first coupling element (1, 14) extends along and substantially in parallel with said predetermined path and having a substantially constant cross-section, said second coupling element (6, 13) extends along at least part of each said body with a substantially constant cross-section in alignment with said first coupling element (1, 14) and substantially parallel to the predetermined path;
   wherein one of said first and second coupling elements (1, 14) is a deformable coupling element that is elastically deformable perpendicular to said predetermined path and wherein the other of said first and second coupling elements (6, 13) is designed to deform the deformable coupling element on pressing the coupling elements against each other to thereby create a friction-type locking between the first and second coupling elements; and,
   said coupling means including guide means at said coupling station for guiding said hauling means and each said at least one body towards each other and for pressing said first and second coupling elements against each other for coupling said body to said hauling means with frictional engagement.

2. The device according to claim 1, further comprising a decoupling station, said decoupling station comprising guide means for pulling said first and second coupling elements apart for decoupling and separating said at least one body from said hauling means.

3. The device according to claim 1, wherein said hauling means comprises an elastically deformable hauling tape, said hauling tape being deformable perpendicular to its length and functions as said first coupling element.

4. The device according to claim 1, wherein said first coupling element comprises an elongated ridge on said hauling means and said second coupling element comprises a groove having two open ends, said first coupling element being positioned in said groove in a compressed state.

5. The device according to claim 4, wherein said hauling tape has a substantially circular cross-section and said groove has a width smaller than a diameter of said tape.

6. The device according to claim 2, including a deflection roller at said coupling station and at said decoupling station, and wherein said hauling means is endless and is guided over said deflection roller (2).

7. The device according to claim 2, wherein at said coupling station and at said decoupling station said at least one body is guided by a support (U).

8. The device according to claim 1, further comprising rails for guiding and supporting said at least one body along at least part of said predetermined path.

9. The device according to claim 8, wherein said body comprises two opposite guiding grooves for said rails and wherein exterior regions of said guiding grooves form grooves for engaging hauling tapes.

10. The device according to claim 9 wherein, along parts of said path along which one said body is coupled to a hauling tape on one side, rails lie inside said hauling tape in said guiding groove (23).

11. The device according to claim 8, wherein said body comprises groups of three balls which each roll on a pair of rails of a guiding channel and said body comprises a part protruding from the guiding channel on which part carries a second coupling element for coupling to a hauling tape or to a first coupling element.

12. The device according to claim 1, wherein said predetermined path comprises gradients, curves or torsion.

* * * * *